(12) United States Patent
M'Sadoques et al.

(10) Patent No.: US 6,329,598 B1
(45) Date of Patent: Dec. 11, 2001

(54) WATER-RESISTANT BUSWAY WITH WATER DRAINAGE DUCT

(75) Inventors: Andre J. M'Sadoques, Southington; William H. Calder, Plainville; Joseph G. Nagy, Southington; David A. Reid, Bristol, all of CT (US); Steven E. Richard, Selmer, TN (US); Adil Ibrahim, Cordova, TN (US); Jeffrey L. Cox, Selmer, TN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/384,886

(22) Filed: Aug. 27, 1999

(51) Int. Cl.[7] ................................ H02G 5/00; H01R 4/60
(52) U.S. Cl. .......................................... 174/68.2; 439/212
(58) Field of Search ...................... 174/682, 70 B, 174/71 B, 72 B, 72.1, 88 B, 99 B; 439/212, 213

(56) References Cited

U.S. PATENT DOCUMENTS

| | | |
|---|---|---|
| 4,758,172 | 7/1988 | Richards et al. . |
| 4,804,804 | 2/1989 | Hibbert et al. . |
| 4,842,533 | 6/1989 | Beberman et al. . |
| 4,849,581 | 7/1989 | Larkin et al. . |
| 4,929,801 | 5/1990 | Hibbert . |
| 4,950,841 | 8/1990 | Walker et al. . |
| 4,957,447 | 9/1990 | Hibbert et al. . |
| 4,979,906 | 12/1990 | Shrout et al. . |
| 5,401,906 | * 3/1995 | Bryant ................................ 174/88 B |
| 5,525,068 | 6/1996 | Graham et al. . |
| 6,142,807 | * 11/2000 | Faulkner ............................. 439/212 |

* cited by examiner

Primary Examiner—Rajnikant B. Patel
(74) Attorney, Agent, or Firm—Cantor Colburn LLP; Carl B. Horton

(57) ABSTRACT

A water-resistant busway with a water drainage duct of the present invention (10) comprises a joint assembly (12) arranged between the ends of first and second busway housings (14, 16). Joint assembly (12) includes a water-resistant cover (30) releasably attached to first and second housings (14, 16) by cover fastening devices (32, 34). Water-resistant cover (30) includes an access hole (36) disposed therein, with access hole (36) receiving a complementary access hole plug (38). Housing spacers (22, 24, 26, 28) each include a water drainage duct (118) disposed therein to drain water from above the water barrier (104) and web (46) of upper piece (42) of housing (14) to below the water barrier and web (46) of the lower piece (44) of housing (14).

20 Claims, 9 Drawing Sheets

WATER-RESISTANT BUSWAY WITH WATER DRAINAGE DUCT

BACKGROUND OF THE INVENTION

The present invention relates to busway type electrical distribution systems. More specifically, the present invention relates to a water-resistant busway with a water drainage duct.

Electrical busways have long been used to transmit multi-phase, high-current electrical power. Busways generally consist of long, rectangular bus bars of copper or aluminum material disposed within a housing. The housing generally comprises a metal top plate, bottom plate, and side plates attached to each other forming an elongated parallelepiped of rectangular cross section. Each side plate of the housing extends above the top plate and below the bottom plate, forming top and bottom flanges extending along the length of the housing.

Modern busways are designed in modular form, with a busway system comprising a series of standard straight lengths, elbows, turns, offsets, and tees connected to each other electrically and mechanically by joints. To form the electrical connection between adjoining busway sections, the joints employ electrically conductive splice plates that slidably engage the bus bars of each adjoining section. The splice plates and bus bars are held together by one or more insulated joint bolts that pass through the splice plates and compress the splice plates onto the bus bars.

Busway housings for use outdoors are designed to prevent the ingress of rain, condensation, and melting snow which is deleterious to internal portions of the busway and can cause an electrical short. Typically, the housing for each section is sealed along the top and sides, with the bus bars extending from the ends of the housing so that they may be attached to the joint. Once the joint and adjoining sections have been connected, a joint cover is attached to complete the water-resistant housing. The joint cover provides water resistance to the joint itself, the joint bolt(s), and the unprotected ends of each section attached to the joint. The joint cover is attached to the joint housing by a plurality of screws.

During installation of the outdoor busway, the technician must bolt the joints and adjoining sections together with the joint bolt(s), then screw the water-resistant joint cover onto the joint. Similarly, during maintenance, the technician must unscrew and remove the joint cover to inspect and re-tighten the joint bolt(s). Unfortunately, the attachment and removal of the joint cover increases the time to install and perform maintenance on the busways and can lead to increased expenses due to stripped or lost screws.

To reduce maintenance time, inspection holes have been placed in the joint cover. This allows the technician to inspect and re-tighten the joint bolts without removing the joint cover. A plug is placed in the inspection hole to prevent water from entering when maintenance is not being performed. The plug comprises an elastomeric portion with a bolt disposed through its center. The plug is placed in the hole and the bolt tightened to compress the elastomeric portion axially so that it expands radially to plug the hole. The plug provides an improvement over having to remove the entire joint cover. However, tightening the plug increases time to perform maintenance and can lead to increased expense if these relatively expensive plugs are lost or destroyed. In addition, the access hole must be round in shape because of the type of plug used. This requirement places a limitation on design flexibility.

Outdoor busways are also designed to drain water that may accumulate on the outside of the housing. Water allowed to accumulate and stand on the external portion of the housing can be deleterious to the housing. This is especially important for the top of the housing where the top flanges and the top plate create a channel where water can be trapped. Typically, weep holes are drilled in the top flanges to drain water from the top of the housing. Unfortunately, the construction of the housing prevents the weep holes from being located so that they are flush with the top plate, nor can the holes be placed close to the joints. Therefore, there are locations on the housing where water will accumulate.

BRIEF SUMMARY OF THE INVENTION

In an exemplary embodiment of the invention, a water-resistant busway with a water drainage duct comprises a first busway housing with a first bus bar disposed therein, and second busway housing with a second busbar disposed therein. A joint assembly is arranged between the first and second busway housings for electrically connecting the first and second bus bars. A joint cover is removably secured to the first busway housing for shielding the joint from water. A spring is arranged between the joint cover and the first busway housing for removably securing the joint cover to the first busway housing.

BRIEF DESCRIPTION OF THE DRAWINGS

The present invention will now be described, by way of example only, with reference to the accompanying drawing in which.

DETAILED DESCRIPTION OF THE INVENTION

Figure 1:
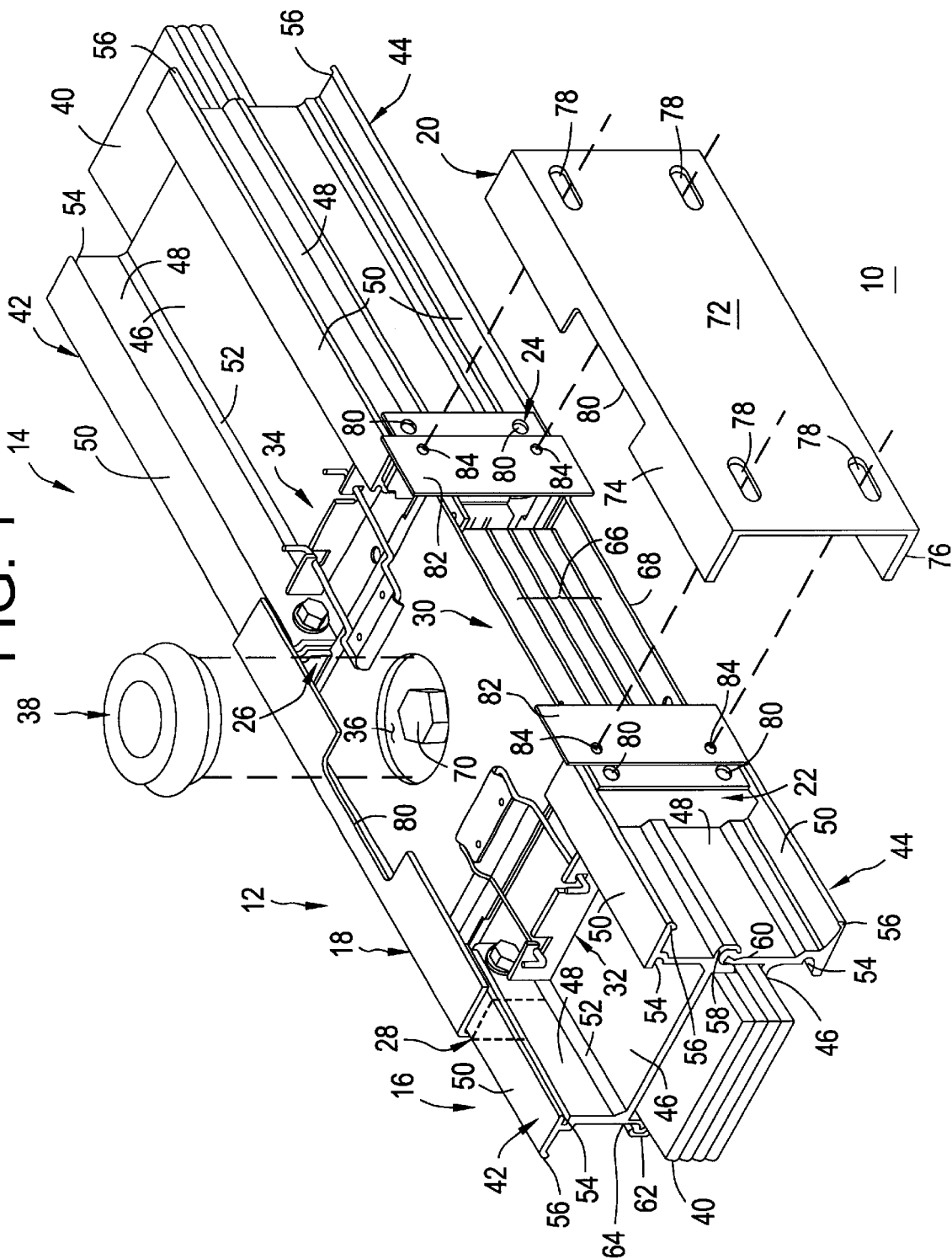
FIG. 1 is an exploded perspective view of a water-resistant busway of the present invention.

Referring to FIG. 1, a water-resistant busway with a water drainage duct of the present invention, generally designated 10, comprises a joint assembly 12 arranged between the ends of first and second busway housings 14, 16. Joint assembly 12 is secured between the ends of the first and second housings 14, 16, by side caps 18, 20 that are bolted to housing spacers 22, 24, 26, 28 secured to housings 14, 18. Joint assembly 12 includes a water-resistant cover 30 releasably attached to first and second housings 14, 16 by cover fastening devices 32, 34. Water-resistant cover 30 includes an access hole 36 disposed therein, with access hole 36 receiving a complementary access hole plug 38.

As is known in the art, a plurality of insulated busbars 40 are enclosed within each busway housing 14, 16. Each busbar 40 represents a separate phase of a multi-phase power distribution system (not shown). Busbars 40 of the same phase are electrically connected within the joint assembly 12 in a manner known in the art.

Each busway housing 14, 16 comprises an extruded top piece 42 positioned opposite a complementary extruded bottom piece 44. Both the top and bottom pieces 42, 44 include a web portion 46 disposed between side flange portions 48 with rail portions 50 extending from the side flange portions 48. Side flange portions 48 extend substantially perpendicular to the web portion 46. The joint between web portion 46 and side flange portion 48 is formed to create an angular fillet 52. Rail portions 50 extend outward along the length side flange portions 48 in a direction substantially perpendicular to side flange portions 48. The joint between the side flange portions 48 and the rail portions 50 is formed to create a channel 54 that extends along the length of the joint. Rail portions 50 are shaped to include a ridge 56 extending along a free edge of rail portions 50. Preferably, the top and bottom pieces 42, 44 are each integrally formed from an aluminum alloy.

One side flange portion 48 on top piece 42 includes a slot 58 formed along an edge of side flange portion 48 opposite the edge from which the rail portion 50 extends. Slot 58 is arranged to receive a projection 60 extending along an edge of one side flange portion 48 on bottom piece 44. Similarly, a slot 62 is formed on the other side flange portion 48 on bottom piece 44 for receiving a projection 64 extending along an edge of the other side flange portion 48 on the top piece 42. Each projection 60, 64 includes an angular detent extending along its length from a free end, and each slot 58, 62 includes a complementary angular detent extending within the slot near its opening. The detents form a snap-fit connection between the top and bottom pieces 42, 44 when projections 60, 64 are inserted in slots 58, 62.

Joint assembly 12 includes electrically conductive splice plates 66 disposed between water-resistant covers 30 and 68. Splice plates 66 are arranged for electrically connecting busbars 40 in a manner known in the art. The splice plates 66 slidably accept bus bars 40 of each busway section 14, 16 to electrically connect the busbars 40 of the same phase. The splice plates 66 and bus bars 40 are held together by an insulated joint bolt 70 that passes through the splice plates 66 to compress the splice plates 66 onto the bus bars 40 when tightened.

Side caps 18, 20 each comprise a substantially planar side portion 72 with top and bottom portions 74, 76 extending substantially perpendicular to side portion 72. Bolt holes 78 in side portion 72 communicate with threaded holes 80 in housing spacers 22, 24, 26, 28 for bolting side caps 18, 20 to housing spacers 22, 24, 26, 28. Top portions 74 are arranged to extend above and substantially parallel to the rail portions 50 on top piece 42 for maintaining structural integrity between the side flanges 48 and upper rail portions 50 of the first and second busway sections 14, 16. Similarly, bottom portions 76 are arranged to extend below and substantially parallel to the rail portions 50 on bottom piece 44 for continuing the structural integrity between the side flanges 48 and lower rail portions 50 of the first and second busway sections 14, 16. Notches 80A in upper portions 74 provide access to hole 36. Side caps 18, 20 are preferably formed from a rigid material such as steel.

Disposed between side caps 18, 20 and housing spacers 22, 24, 26, 28 are alignment plates 82. Alignment plates 82 are secured to housing spacers 22, 24, 26, 28 via screw holes 84 disposed therein. The substantially planar alignment plate 82 provides a surface for guiding the water-resist covers 30 and 68. After installation and fastening of the top and bottom covers 30 and 68 the alignment plate 82 is removed and discarded.

Figure 2:
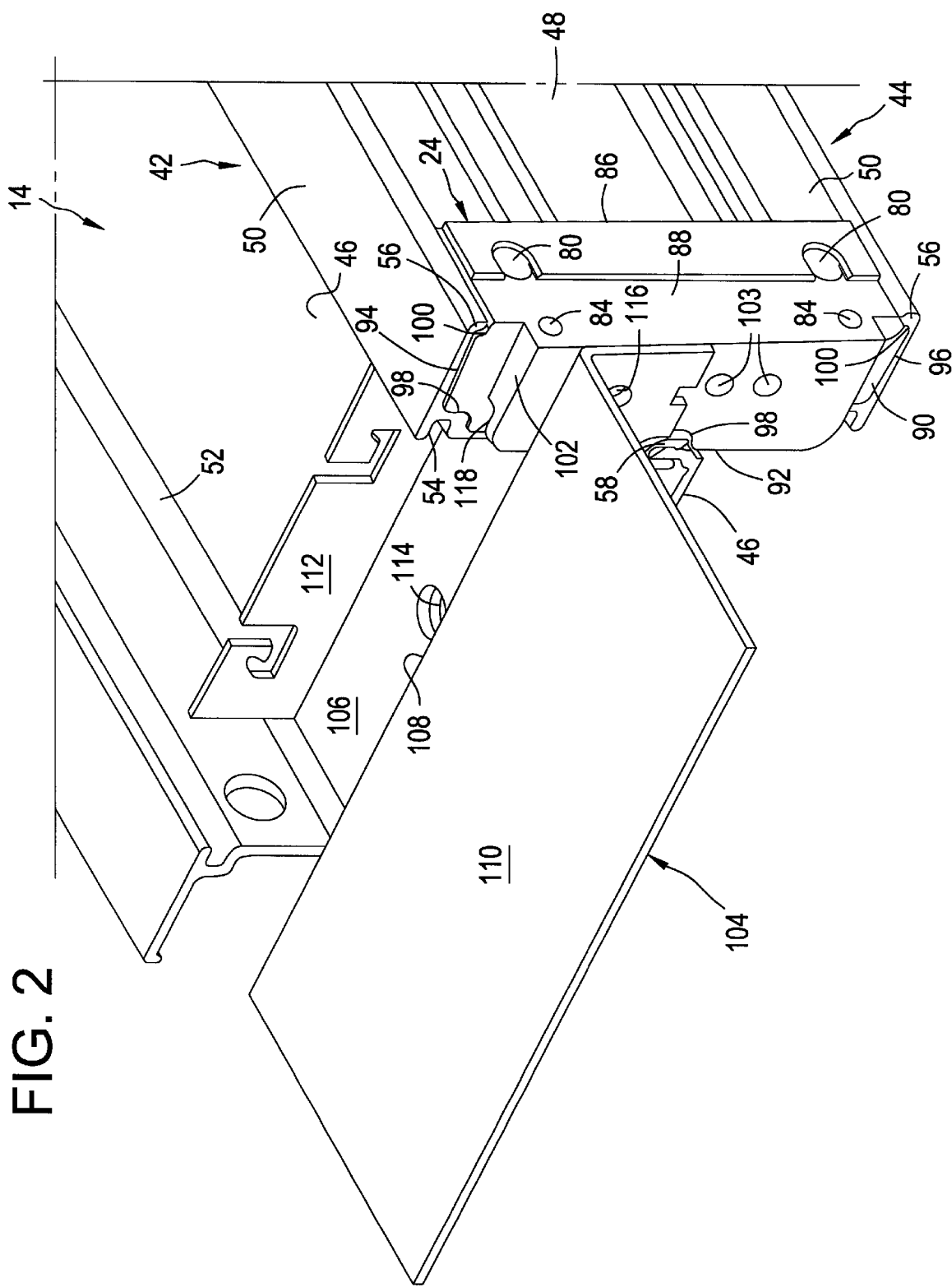
FIG. 2 is a perspective view of a busway housing of the water-resistant busway of FIG. 1.

As shown in FIG. 2, housing spacer 24 is substantially formed as rectangular prism including four sides 86, 88, 90, 92 and a top 94 and bottom 96. Housing spacer 24 is described herein for example, and is substantially similar to housing spacers 22, 26, and 28. Side 92 of spacer 24 is flush against side flange portions 48 of the top and bottom pieces 42, 44 of the housing 14. Side 92 includes notches 98 disposed therein conforming to the external surface of channel 58 and to the external surface of slot 54, which both extend outward from side flange portions 48. Side 92 is secured against side flange portions by bolts (not shown). Top 94 and bottom 96 include notches 100 disposed therein conforming to ridge 56 extending from rail portions 50.

Side 90 of a housing spacer 24 includes a spacing portion 102 extending substantially along its length. Spacing portion 102 includes holes 103 disposed in a side distal from side 90 of housing spacer 24. Holes 103 allow water barrier 104 to be attached to housing spacer 24.

Water barrier 104 includes a substantially flat mounting portion with a riser portion 108 extending upward from, and substantially perpendicular to, the mounting portion 106. A substantially flat sealing surface 110 extends outward and substantially perpendicular to said rising portions 108 and a fastening portion 112 extends upward from, and substantially perpendicular to, mounting portion 106. Mounting portion 106 includes a bolt hole 114 for securing the water barrier 104 to the web 46 of housing 14. The substantially flat, lower surface of the mounting portion 106 rests on the substantially flat, upper surface of web 46, creating a water-resistant seal therebetween. Riser portion 108 includes a bolt hole 116 disposed therein for securing the water barrier 104 to the spacing portion 102 of housing spacer 24. The substantially flat surface of the riser portion 108 rests on the substantially flat surface of the spacing portion 102, creating a water-resistant seal therebetween. Water barrier 104 attached to top piece 42 of housing 14 is substantially similar to water barriers attached to the upper and lower pieces 42, 44 of housing 14 and the lower piece 44 of housing 14 in the completed assembly.

Spacing portion 102 further includes a water drainage duct 118 disposed therein. Drainage duct 118 extends along flange portion 48 of top and bottom pieces 42, 44 to drain water from above the water barrier 104 and web 46 of upper piece 42 to below the water barrier (not shown) and web 46 of the lower piece 44.

Figure 3:
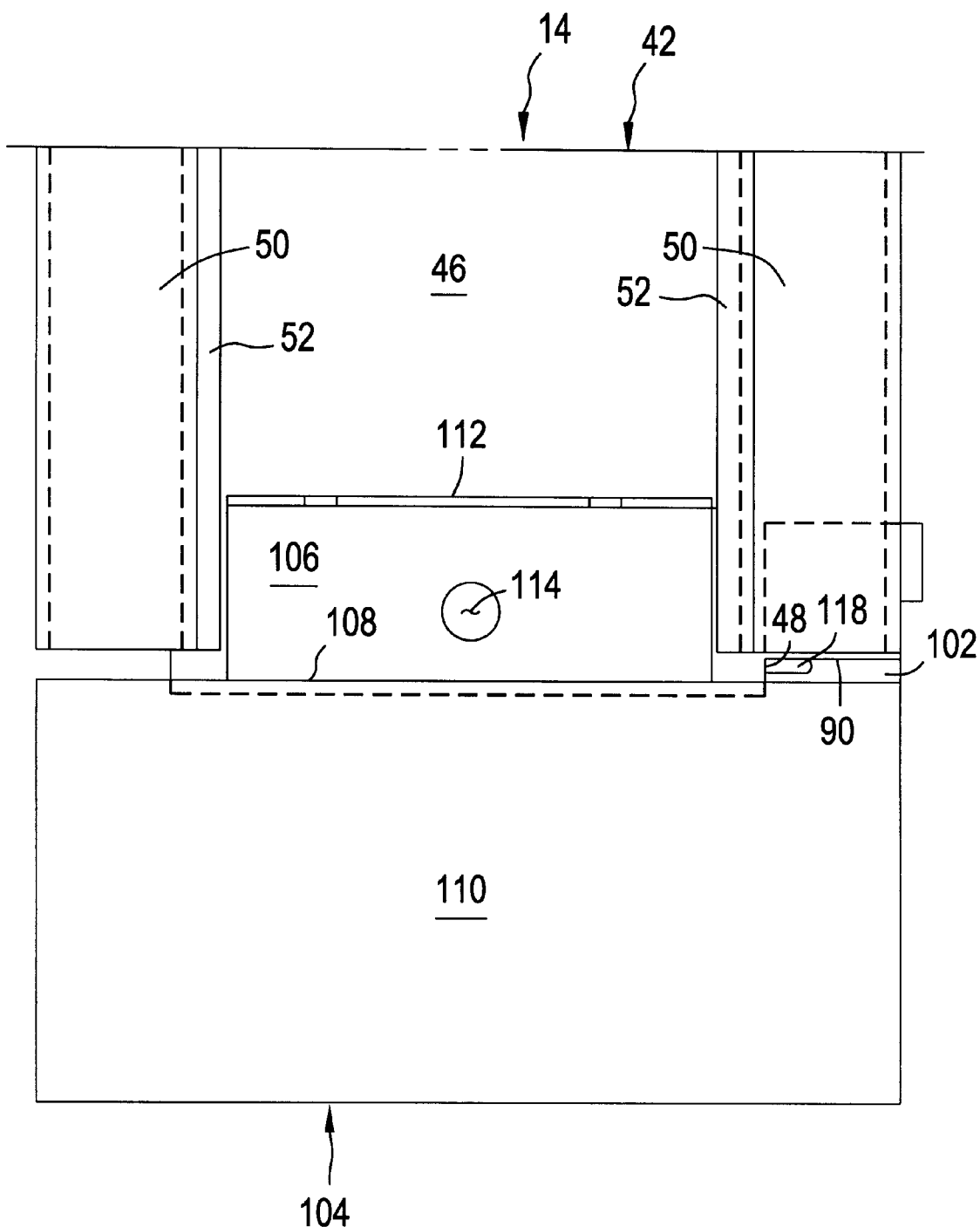
FIG. 3 is a top view of the first busway housing of FIG. 2.

As is best shown in FIG. 3, spacing portion 102 creates two walls of the drainage duct 118 with side 90 of housing spacer 24 creating a third wall. A fourth wall of drainage duct 118 is created by side flanges 48 of top and bottom pieces 42, 44 of housing 14. A portion of side flange 48 above web 46 and proximal to end of housing 14 is removed, along with the attached rails 50 and fillets 52. The removal of this portion of side flanges 48 allows the opening of drainage duct 118 to be flush with web 46 on the upper portion 42 of the housing 14. Any water that may collect on top of water barrier 104 and web 46 enters the drainage duct 118. The water then flows through the duct 118 and exits below web 46 of the lower portion of the housing.

Compared to the prior art, drainage duct 118 reduces the amount of water that can accumulate above water barrier 104 and web 46. This is accomplished because the entrance to duct 118 is flush with web 46 and because the location of duct 118 is near the joint 12 (FIG. 1).

Figure 4:
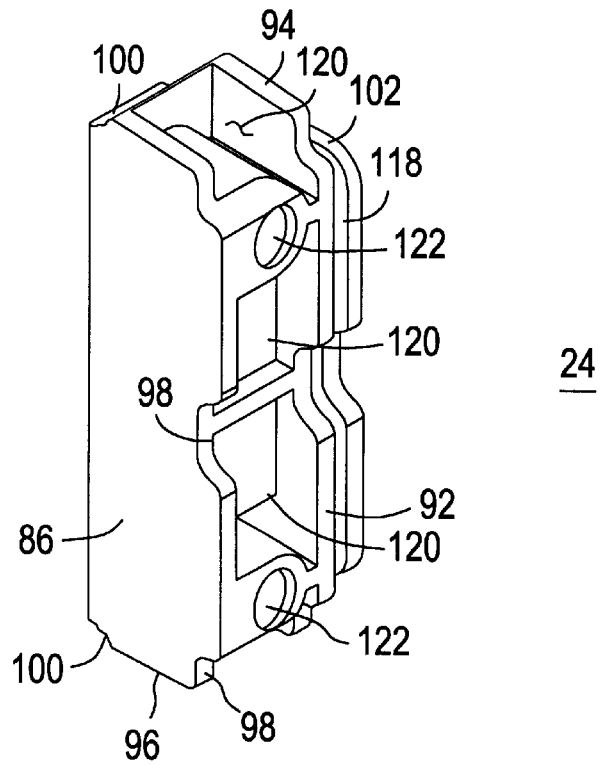
FIGS. 4 and 5 are perspective views of a housing spacer of the water-resistant busway of FIG. 1.
Figure 5:
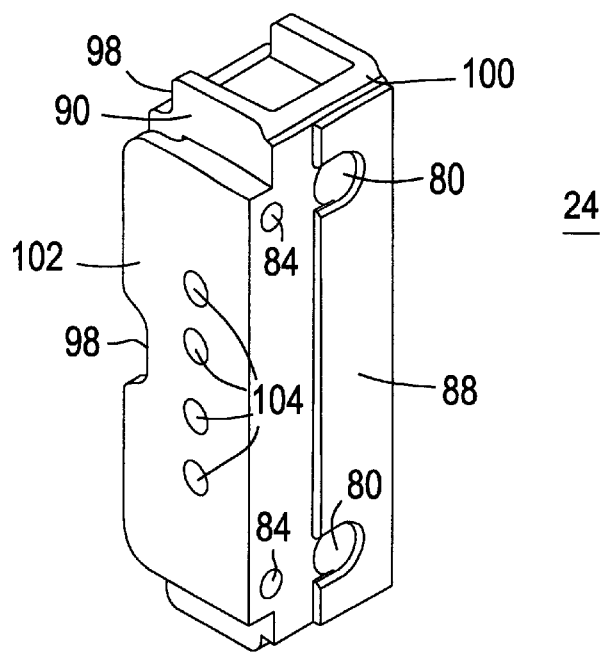

FIGS. 4 and 5 show detailed views of housing spacer 24. As seen in FIG. 4, drainage duct 118 extends along the length of spacing portion 102. Side 92, top 94 and bottom 96 include lightening chambers 120. Lightening chambers 120 are disposed in housing spacer 24 to reduce the amount of material used in construction and to decrease the weight of the housing spacer 24. Side 92 also includes threaded holes 122 for attaching housing spacer 24 to housing 14. Again, housing spacer 24 is shown for purposes of example, and housing spacers 22, 26 and 28 are substantially similar.

Figure 6:
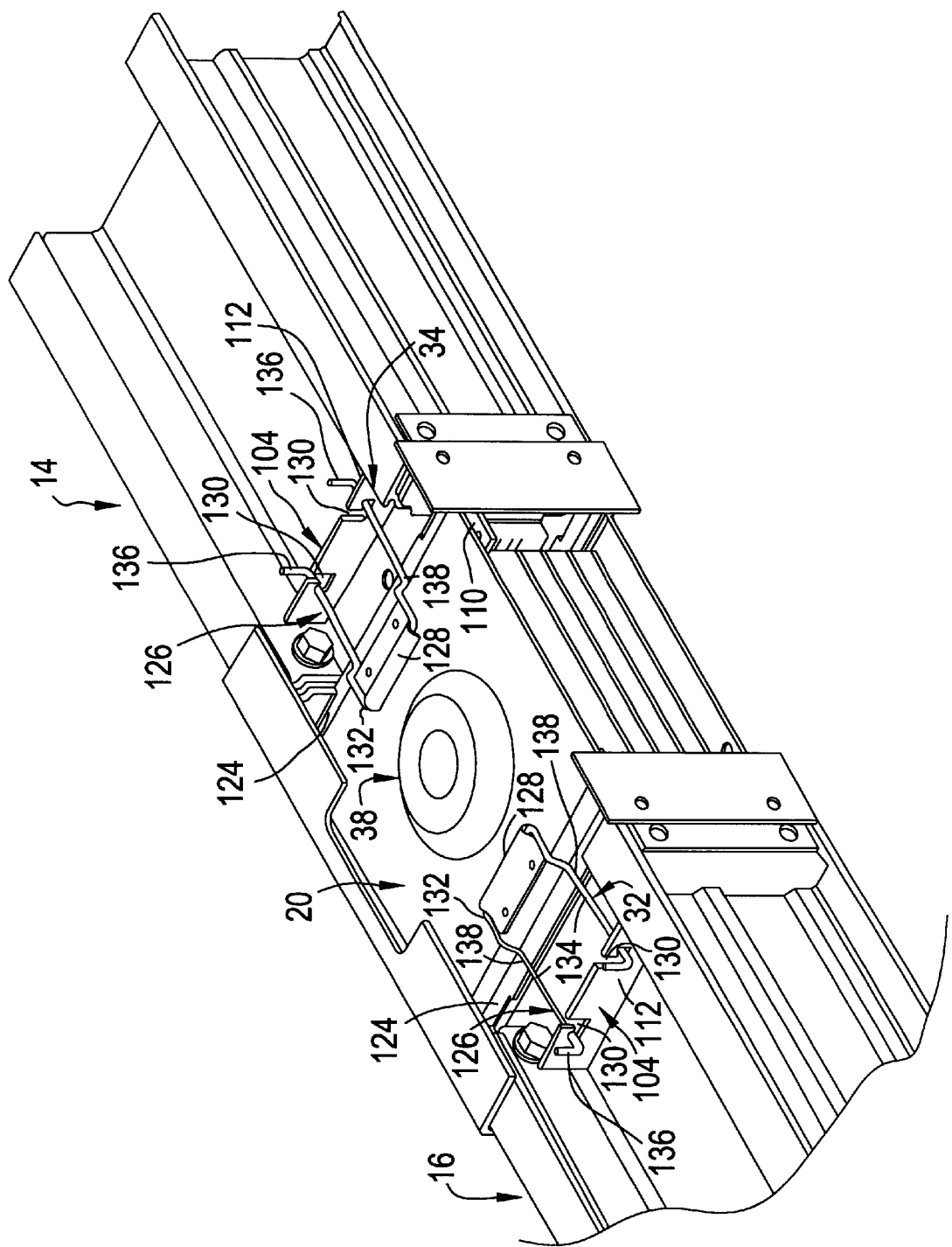
FIG. 6 is a perspective view of the fastening devices of the water-resistant busway of FIG. 1.

FIG. 6 provides a view of water-resistant cover 20 releasably attached to first and second housings 14, 16 by cover fastening devices 32, 34. Cover 20 includes flanges 124 formed thereon at each end proximate first and second housings 14, 16. The bottom surface of flange 124 rests on sealing surface 110 of water barrier 104 when cover 20 is installed.

Fastening devices 32, 34, each include a spring 126 hingedly secured to cover 20 by retainers 128, and slots 130 disposed in fastening portion 112 of water barrier 104 for accepting the spring 126. Each spring 126 is formed from a single piece of wire, and includes a hinge portion 132 and leg portions 134. Hinge portion 132 is disposed in retainer 128. Leg portions 134 extend from hinged portion 132 and are substantially parallel to each other. Each leg portion 134 is bent to form a grip portion 136 at the free end, with a contact portion 138 formed at a point intermediate hinge portion 132 and grip portion 136.

Slots 130 are substantially "L" shaped, and are sized to accept legs 134. The vertical portion of slots 130 are spaced apart a distance less than the distance between legs 134. The horizontal portion of slots 130 includes a notch located at an end distal to the vertical portion. These notches are spaced apart a distance approximately equal to the distance between legs 134.

Cover 20 is installed on joint 12 by placing cover 20 on the sealing surface 110, deflecting legs 134 towards each other, depressing legs 134 downward into the vertical portion of slots 130 to load the force of spring 126 against the cover 20, then releasing the legs 134, allowing them to extend outward in the horizontal portions of slots 130 where the legs will rest in the notches of slots 130. Cover 20 is forced downward onto sealing surface 110 by the force of spring 126. Hinge portion 132 of spring 126 acts with force against the retainer 128. Contact portion 138 of spring 126 acts with a substantially downwards force on flange 124 of cover 20. A portion of legs 134 near grips 136 acts with a substantially upward force on slots 130.

The removal and installation of screws to attach the cover is no longer required. Therefore, fastening devices 32, 34 of the above-described invention reduces the time to install or remove the cover to less time than was previously possible. Fastening devices 32, 34 also eliminate expenses due to stripped or lost screws.

Figure 7:
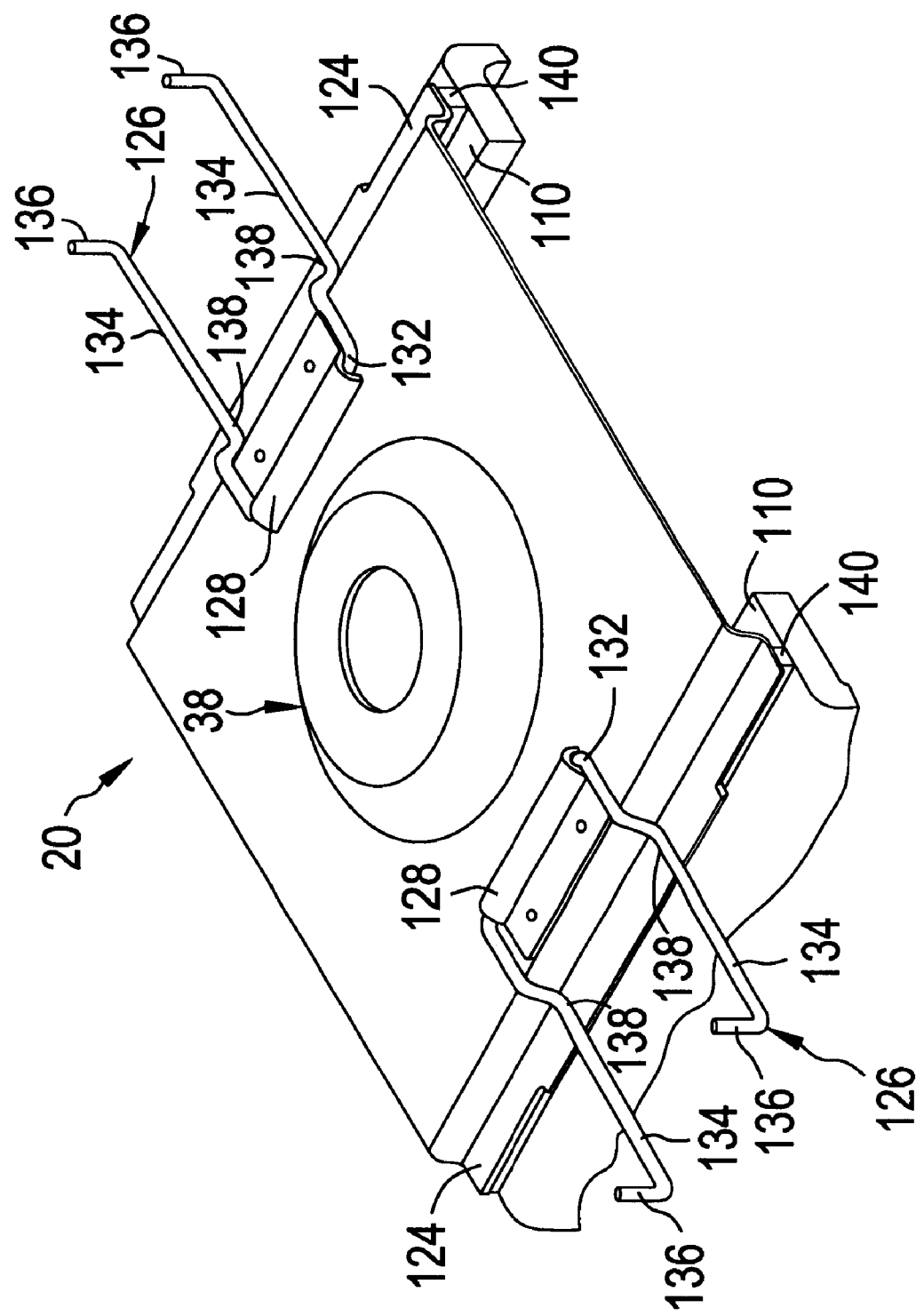
FIG. 7 is a perspective view of the water-resistant cover of the water-resistant busway of FIG. 1.

FIG. 7 shows a detailed view of cover 20. Cover 20 includes gaskets 140 attached to the lower portion of flange 124. Gaskets 140 are compressed against sealing surface 110 when cover 20 is installed, to provide a water-resistant seal between cover 20 and sealing surface 110.

Figure 8:
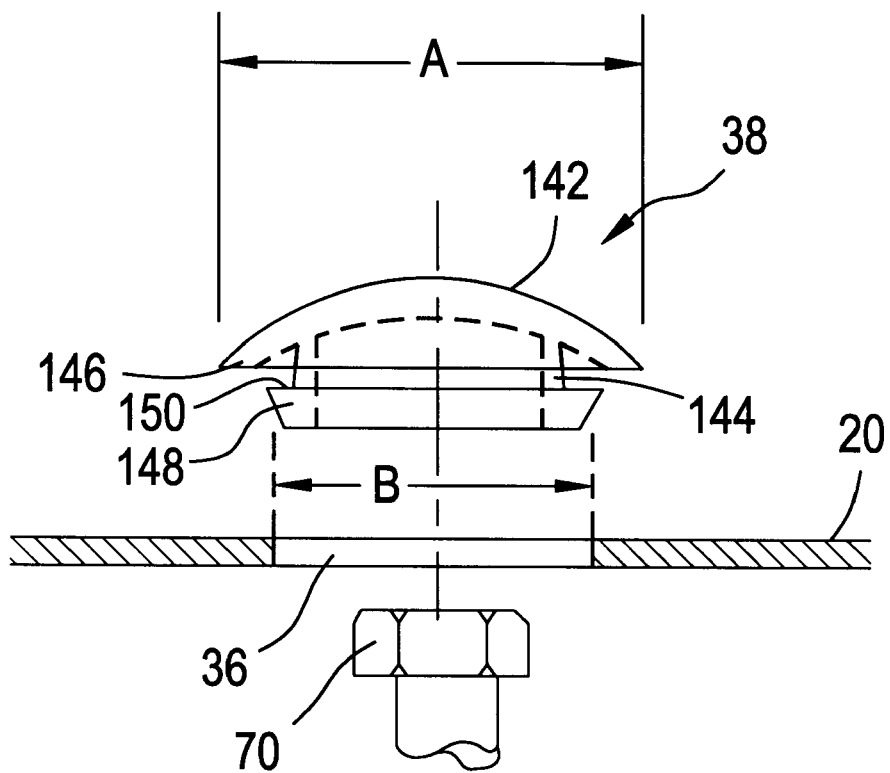
FIG. 8 is an elevation view of the access hole plug of the water-resistant cover of FIG. 7.

FIG. 8 shows a detailed view of access hole plug 38. Plug 38 includes a radiused cap 142 with a substantially cylindrical body 144 extending from a concave side of radiused cap 142. Radiused cap 142 includes an outside diameter "A" greater than an inside diameter "B" of access hole 36. Radiused cap 142 further includes a first sealing surface 146 formed beneath its circumference. Body 144 includes an outside diameter less than the inside diameter "B" of access hole 36. Body 144 further includes an angular detent 148 extending radially therefrom at an end distal from cap 142. The outside diameter of angular detent 148 is greater than the inside diameter "B" of access hole 36. The upper portion of angular detent 143 forms a second sealing surface 150. The distance between the first and second sealing surfaces 146, 150 is less than the thickness of cover 20. Plug 38 is formed from a resiliently flexible material.

Figure 9:
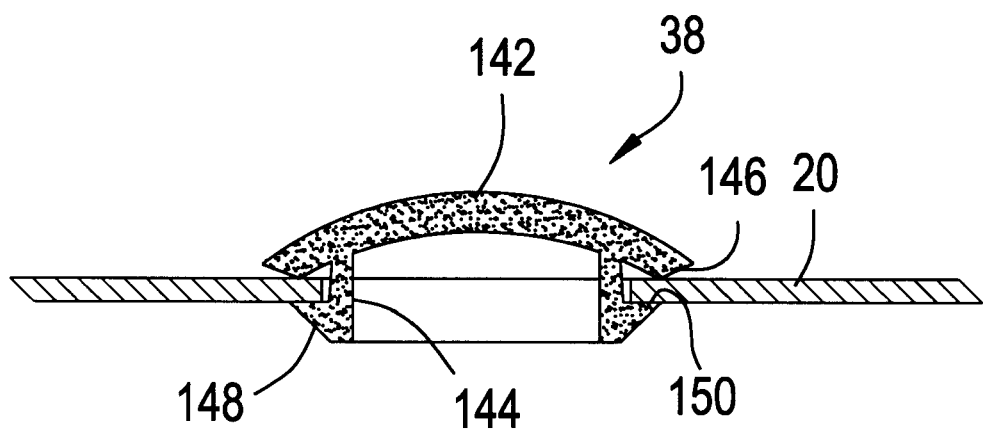
FIG. 9 is a sectional view of the access hole plug of FIG. 8.

FIG. 9 shows a sectional view of an installed plug 38. Plug 38 is installed onto cover 20 by aligning detent 148 with access hole 36 and pressing downward on plug 38. Resiliently flexible detents 148 and body 144 allow the detents 148 to pass through hole 36 and snap fit onto cover 20. Resiliently flexible cap 142 deflects, sandwiching cover 20 between the first and second sealing surfaces 146, 150.

Bolting and unbolting of access plug 38 is not required. Therefore, the above-described invention reduces the time to install or remove an access plug to less time than was previously possible. In addition, the plug of the present invention is relatively inexpensive, thus reducing the cost due to lost or destroyed plugs.

As will be seen by one skilled in the art, plug 38 of the above-described invention can be shaped for use in access holes 36 of non-circular shape. For example, where access hole 36 is oblong, the body 144, cap 142, and detent 146 of plug 38 can be shaped to conform thereto. Therefore, the plug of the above-described invention allows for increased design flexibility over that possible with the prior art.

Figure 10:
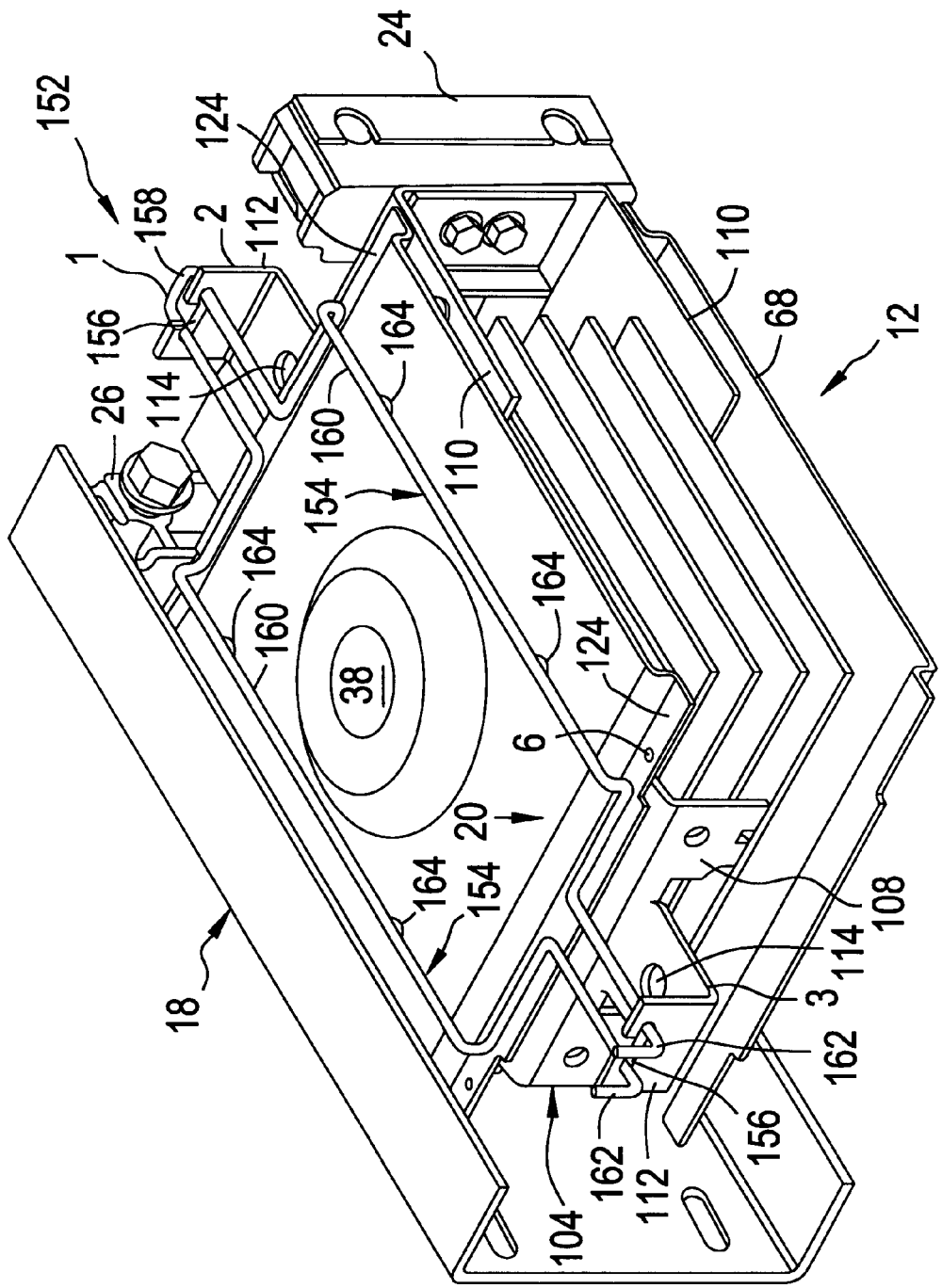
FIG. 10 is a view similar to FIG. 6 but of an alternative embodiment of this invention.

An alternate embodiment is shown in FIG. 10. The alternate embodiment is substantially similar to the embodiment described above, with like features numbered alike and differences described below. FIG. 10 shows a fastening device 152 including a spring 154 spanning cover 20, and slots 156 disposed in fastening portion 112 of water barrier 104 for accepting the spring 154. Spring 154 is formed from a single piece of wire, and includes an end portion 158 with legs 160 extending therefrom. Each leg portion 160 includes a grip 162 at a free end, and pressure points 164 attached thereto. The portion of legs 160, intermediate grip 162 and end portion 158 is bent to conform to the shape of cover 20, with the legs 160 passing above the flanges 124 and top surface of cover 20. Legs 160 are substantially parallel to each other as they pass above the top surface of cover 20, with legs 160 separated by a distance greater than the outside diameter of plug 38 for providing access to plug 38. Pressure points 164 contact the top surface of cover 20 for transmitting the force of spring 154 onto cover 20.

Cover 20 is installed on joint 12 by placing the cover on the sealing surface 110, inserting end portion 158 of spring 154 through a first slot 156, deflecting legs 160 towards each other, depressing the legs downward into the vertical portion of a second slot 156 on the opposite end of cover 20 to load the force of spring 154 against the cover 20, then releasing the legs 150, allowing them to extend outward in the second horizontal slot 156. Cover 20 is forced downward onto sealing surface 110 by the force of spring 154. Legs 160 of spring act with substantially upward force on slots 156. Pressure points 164 attached to spring 154 act with a substantially downward force on upper surface of cover 20. contact the internal portion of channel 54 for aligning plate 168 within channel 54.

Figure 11:
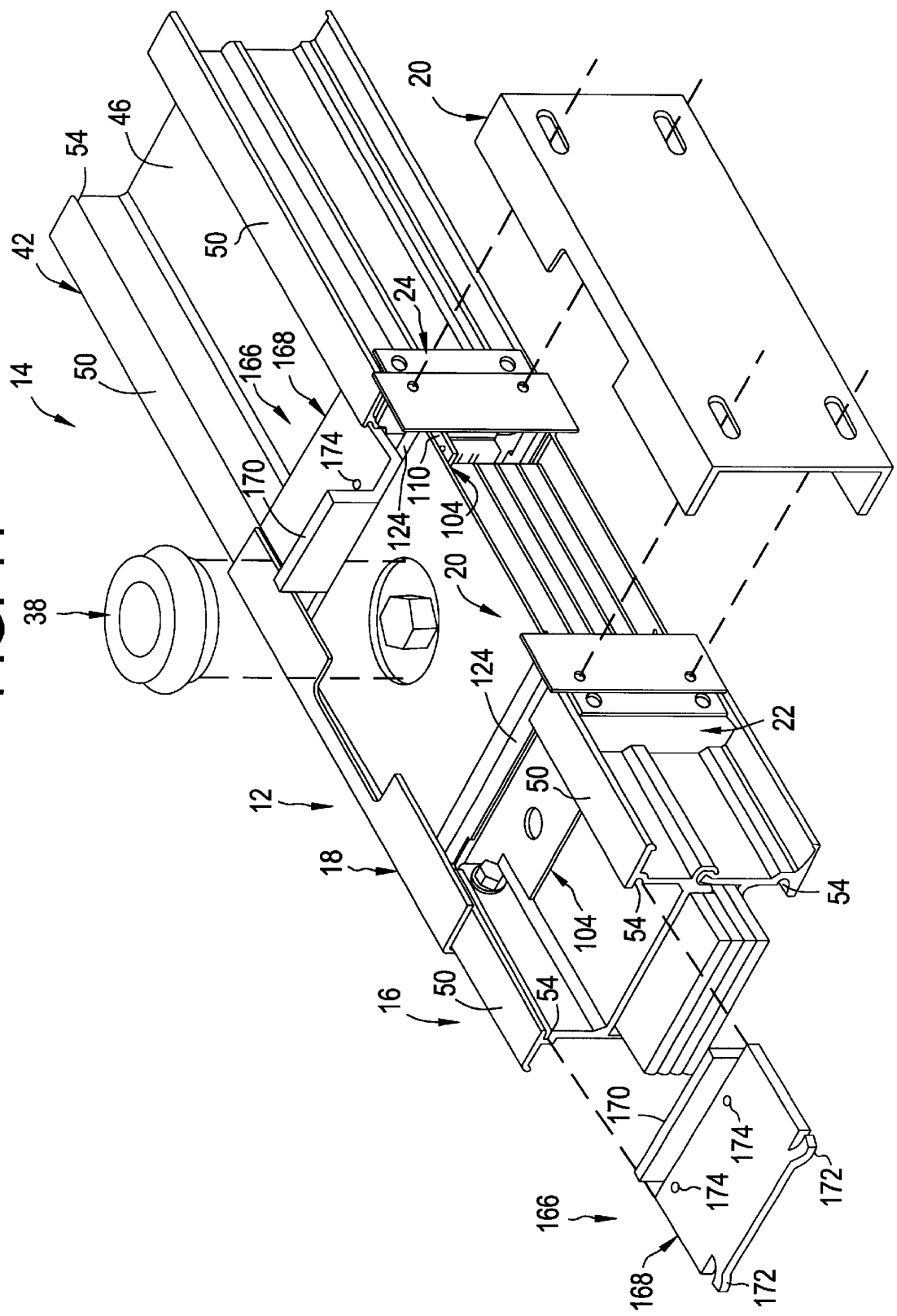
FIG. 11 is another alternative embodiment of this invention.

Another alternative embodiment is shown in FIG. 11. FIG. 11 shows fastening devices 166 each comprising a plate 168 slidably engaging channels 54. Cover 20 is installed on the joint 12 by placing the cover 20 on the sealing surface 110, sliding plates 168 inward to position holes 174 over flanges 124 in cover 20, and tightening screws downward onto cover 20. Screws force cover 20 onto sealing surface 110 of water seal 104.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A water-resistant busway including;
   first and second busway housings, said first busway housing including a first bus bar disposed therein, and said second busway housing including a second bus bar disposed therein;
   a joint assembly arranged between said first and second busway housings, said joint assembly for electrically connecting the first and second bus bars;
   a joint cover removably secured to said first busway housing and arranged for shielding said joint assembly from water; and
   a spring arranged between said joint cover and said first busway housing for removably securing said joint cover to said first busway housing.

2. The water-resistant busway of claim 1 wherein said first busway housing includes a fastening portion extending therefrom, said fastening portion including a slot disposed therein for receiving said spring.

3. The water-resistant busway of claim 2 wherein said spring is hingedly attached to said joint cover.

4. The water-resistant busway of claim 1 wherein said spring is further arranged between said second busway housing and said joint cover.

5. The water-resistant busway of claim 4 wherein said first busway housing includes a first fastening portion extending therefrom, said first fastening portion including a first slot disposed therein for receiving said spring, and said second busway housing includes a second fastening portion extending therefrom, said second fastening portion including a second slot disposed therein for receiving said spring.

6. The water-resistant busway of claim 5 wherein said spring includes pressure points extending therefrom and contacting said cover for transmitting force from said spring to said cover.

7. The water-resistant busway of claim 1 wherein said cover includes an access hole disposed therein, and further comprising:
   a water-resistant plug is snap-fit into the access hole for preventing water from entering the access hole.

8. The water-resistant busway of claim 7 wherein said water-resistant plug includes:
   a cap with a first sealing surface formed beneath its periphery, said first sealing surface for contacting a first side of said cover,
   a body extending from said cap, and
   a detent extending about the periphery of said body at a free end of said body, said detent including a second sealing surface formed on a side of said detent proximal to said first sealing surface for contacting a second side of said cover.

9. The water-resistant busway of claim 1 wherein:
   said first busway housing includes first and second side flanges disposed on opposing sides of the bus bar, said first and second side flanges including first and second webs extending between said first and second side flanges, said first web positioned above the bus bar and said second web positioned below the bus bar; and
   a drainage duct disposed on said first side flange and extending from said first web to said second web for draining water from above said first web to below said second web.

10. The water-resistant busway of claim 9 further including:
    a housing spacer secured to said first side flange, said housing spacer is substantially in the shape of a rectangular prism, with a top, a bottom, and four sides, a first side of said four sides is in contact with said first side flange, a second side of said four sides extends perpendicularly from said first side, said second side includes a spacing portion projecting outward therefrom and extending substantially from said top to said bottom, said drainage duct being formed by a slot disposed in said spacing portion.

11. A water-resistant busway including:
    first and second busway housings, said first busway housing including a first bus bar disposed therein, and said second busway housing including a second bus bar disposed therein;
    a joint assembly arranged between said first and second busway housings, said joint assembly for electrically connecting the first and second bus bars;
    a joint cover removably secured to said first busway housing and arranged for shielding said joint assembly from water; and
    a plate slidably engaged by said first busway housing, said plate slidably extending over a portion of said joint cover for removably securing said joint cover to said first busway housing.

12. The water-resistant busway of claim 11 wherein said plate includes a hole disposed therein for threadably accepting a screw, said screw extending through said plate for contacting said joint cover.

13. The water-resistant busway of claim 11 wherein said cover includes an access hole disposed therein, and further comprising:
    a water-resistant plug is snap-fit into the access hole for preventing water from entering the access hole.

14. The water-resistant busway of claim 13 wherein said water-resistant plug includes:
    a cap with a first sealing surface formed beneath its periphery, said first sealing surface for contacting a first side of said cover,
    a body extending from said cap, and
    a detent extending about the periphery of said body at a free end of said body, said detent including a second sealing surface formed on a side of said detent proximal to said first sealing surface for contacting a second side of said cover.

15. The water-resistant busway of claim 11 wherein:
    said first busway housing includes first and second side flanges disposed on opposing sides of the bus bar, said first and second side flanges including first and second webs extending between said first and second side flanges, said first web positioned above the bus bar and said second web positioned below the bus bar; and a drainage duct disposed on said first side flange and extending from said first web to said second web for draining water from above said first web to below said second web.

16. The water-resistant busway of claim 15 further including:

a housing spacer secured to said first side flange, said housing spacer is substantially in the shape of a rectangular prism, with a top, a bottom, and four sides, a first side of said four sides is in contact with said first side flange, a second side of said four sides extends perpendicularly from said first side, said second side includes a spacing portion projecting outward therefrom and extending substantially from said top to said bottom, said drainage duct being formed by a slot disposed in said spacing portion.

17. A joint assembly for electrically connecting electrical bus bars, said joint assembly including:

a joint cover, said joint cover including an access hole disposed therein; and a water-resistant plug snap-fit into the access hole for preventing water from entering the access hole.

18. The joint assembly of claim 17 wherein said water-resistant plug includes:

a cap with a first sealing surface formed beneath its periphery, said first sealing surface for contacting a first side of said cover, a body extending from said cap, and a detent extending about the periphery of said body at a free end of said body, said detent including a second sealing surface formed on a side of said detent proximal to said first sealing surface for contacting a second side of said cover.

19. A water-resistant busway housing including:

first and second side flanges disposed on opposing sides of a bus bar;

first and second webs extending between said first and second side flanges, said first web positioned above the bus bar and said second web positioned below the bus bar; and a drainage duct disposed on said first side flange and extending from said first web to said second web for draining water from above said first web to below said second web.

20. The water-resistant busway housing of claim 19 further including:

a housing spacer secured to said first side flange, said housing spacer is substantially in the shape of a rectangular prism, with a top, a bottom, and four sides, a first side of said four sides is in contact with said first side flange, a second side of said four sides extends perpendicularly from said first side, said second side includes a spacing portion projecting outward therefrom and extending substantially from said top to said bottom, said drainage duct being formed by a slot disposed in said spacing portion.

* * * * *